United States Patent
Parker et al.

(10) Patent No.: US 12,007,264 B1
(45) Date of Patent: *Jun. 11, 2024

(54) SYSTEM AND METHOD FOR REDUCING GAS BREAK OUT IN MPD METERING WITH BACK PRESSURE

(71) Applicant: PRUITT TOOL & SUPPLY CO., Fort Smith, AR (US)

(72) Inventors: Martyn Parker, Fort Smith, AR (US); Benjamin Micah Spahn, Alma, AR (US)

(73) Assignee: PRUITT TOOL & SUPPLY CO., Fort Smith, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,973

(22) Filed: Apr. 3, 2023

Related U.S. Application Data

(63) Continuation of application No. 16/927,540, filed on Jul. 13, 2020, now Pat. No. 11,619,531, which is a continuation of application No. 16/415,957, filed on May 17, 2019, now Pat. No. 10,712,190.

(60) Provisional application No. 62/673,014, filed on May 17, 2018.

(51) Int. Cl.
| | |
|---|---|
| E21B 21/08 | (2006.01) |
| E21B 21/10 | (2006.01) |
| G01F 1/84 | (2006.01) |
| G05D 16/20 | (2006.01) |

(52) U.S. Cl.
CPC .............. *G01F 1/845* (2013.01); *E21B 21/08* (2013.01); *E21B 21/106* (2013.01); *G05D 16/2013* (2013.01)

(58) Field of Classification Search
CPC ........ E21B 21/08; E21B 21/106; G01F 1/845; G05D 16/2013
See application file for complete search history.

(56) References Cited

U.S. PATENT DOCUMENTS

| | | | |
|---|---|---|---|
| 9,605,502 B2 * | 3/2017 | Leuchtenberg | ......... E21B 17/01 |
| 10,712,190 B1 * | 7/2020 | Parker | ................ G05D 16/2013 |
| 11,619,531 B1 * | 4/2023 | Parker | ..................... G01F 1/845 |
| | | | 73/861.354 |

* cited by examiner

*Primary Examiner* — Matthew R Buck
(74) *Attorney, Agent, or Firm* — Schrantz Law Firm, PLLC; Stephen D. Schrantz

(57) ABSTRACT

A system and method of maintaining back pressure located downstream of the flow meter maintains the pressure downstream of the flow meter in relation to the surface back pressure (SBP). At least one flow control device is located downstream of the flow meter. The flow control device (the BPV) automatically maintains the downstream pressure to less than or equal to fifty percent (50%) of the surface back pressure. A pressure regulator sets the back pressure to allow for a standalone device. Additional valves allow adjustment of the back pressure and allow for pressure relief and full flow bypass.

19 Claims, 2 Drawing Sheets

SYSTEM AND METHOD FOR REDUCING GAS BREAK OUT IN MPD METERING WITH BACK PRESSURE

CROSS-REFERENCE TO RELATED APPLICATIONS

This application claims priority to and is a continuation of U.S. patent application Ser. No. 16/927,540 filed on Jul. 13, 2020 entitled "SYSTEM AND METHOD FOR REDUCING GAS BREAK OUT IN MPD METERING WITH BACK PRESSURE" which is a continuation of U.S. patent application Ser. No. 16/415,957 filed on May 17, 2019 entitled "SYSTEM AND METHOD FOR REDUCING GAS BREAK OUT IN MPD METERING WITH BACK PRESSURE" that issued as U.S. Pat. No. 10,712,190 on Jul. 14, 2020 which is a continuation in part of U.S. Patent Application No. 62/673,014 filed on May 17, 2018 entitled "SYSTEM AND METHOD FOR REDUCING GAS BREAK OUT IN MPD METERING WITH BACK PRESSURE."

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to maintaining back pressure downstream from a Coriolis meter. More specifically, the present invention is related to a back pressure manifold and a method of managing pressure within a managed pressure drilling operation. The present invention is also related to improving the accuracy of the measurements from the Coriolis meter.

Background

In drilling, the Coriolis meter can measure volume flow rates and density of the drilling fluid. For example, in a managed pressure drilling (MPD) system, fluid flow is typically measured using a Coriolis flow meter to determine lost circulation, to detect fluid influxes or kicks, to measure mud density, to monitor fluid returns, etc.

Managed Pressure Drilling (MPD) operations run the risk of gas entrained in the drilling mud breaking out of solution as the pressure is released. In MPD, the gas breaks out of solution after the MPD drilling flow control device, generally, a drilling choke. Some MPD operators have resorted to installing a manually operated globe valve downstream of the Coriolis meter. The MPD operators manipulate this valve to reduce the gas breakout in the meter and to gain metering efficiency with the Coriolis meter.

The installation of such a globe valve has several risks associated with it. Although the globe valve is adjustable, the globe valve is only a manually adjusted fixed orifice. If flow rate is increased, the pressure upstream will also increase. Likewise, if flow rate is reduced, the pressure will drop and Coriolis meter accuracy will once again become affected.

The globe valve provides a fixed orifice. If the globe valve becomes plugged, an overpressure event is possible. The overpressure event affects the system and potentially the pressure design operating range of components downstream of the MPD flow control device, such as the drilling choke.

The system and method of maintaining back pressure of the present invention provides a significantly better solution and increased system safety pressure protection.

SUMMARY OF THE INVENTION

The system and method of maintaining back pressure of the present invention provides a back pressure valve manifold system located downstream of the flow meter, such as a Coriolis meter. The back pressure valve manifold system of the present invention provides at least one flow control device located downstream of the Coriolis meter.

The at least one flow control device located downstream of the flow meter, such as the Coriolis meter, automatically maintains the downstream pressure to a desired pressure in relation to the upstream pressure, such as the surface back pressure. The back pressure valve of the present invention (the BPV) automatically maintains the downstream pressure to less than or equal to fifty percent (50%) of the surface back pressure.

During an MPD operation using a fully automated or semi-automated MPD system, the MPD control system automatically adjusts a flow control device (typically a choke) in order to achieve a desired surface back pressure (SBP). In a pressure system, it is desirable to maintain critical flow across a pressure drop so that pressure variation downstream of a flow control device does not affect the upstream pressure, such as the SBP. Critical flow is typically ≤50% of the upstream pressure.

In the present invention, a BPV back pressure valve is located downstream of the flow meter, such as the Coriolis meter. The BPV automatically controls the downstream pressure in relation to the SBP. As the SBP changes, the BPV adjusts to change the downstream pressure. As the SBP changes in the MPD system, the BPV downstream of the Coriolis meter adjusts to be ≤50% (less than or equal to fifty percent) of the upstream pressure (SBP). The adjustment of the downstream pressure minimizes gas breakout of solution from the drilling mud. Such adjustments improve the accuracy of the flow rate measurement by the Coriolis meter.

It is an object of the present invention to provide a back pressure manifold system located downstream of the Coriolis meter.

It is also an object of the present invention to maintain the pressure downstream of the Coriolis meter in relation to the surface back pressure.

It is also an object of the present invention to automatically adjust for desired SBP set point.

It is also an object of the present invention to automatically adjust the BPV to maintain back pressure at 50% of the surface back pressure.

It is also an object of the present invention to reduce the flow line velocity when gas is entrained in solution with drilling mud and drilled cuttings.

It is also an object of the present invention to significantly reduce the potential for erosion at the drilling choke and all downstream components.

It is also an object of the present invention to set the MPD system with a high maximum pressure to protect the lower pressure rated equipment downstream of the MPD choke manifold.

It is also an object of the present invention to provide a fail open bypass actuated valve designed to open in event of either blockage of a Coriolis meter tube(s) or the BPV.

In addition to the features and advantages of the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
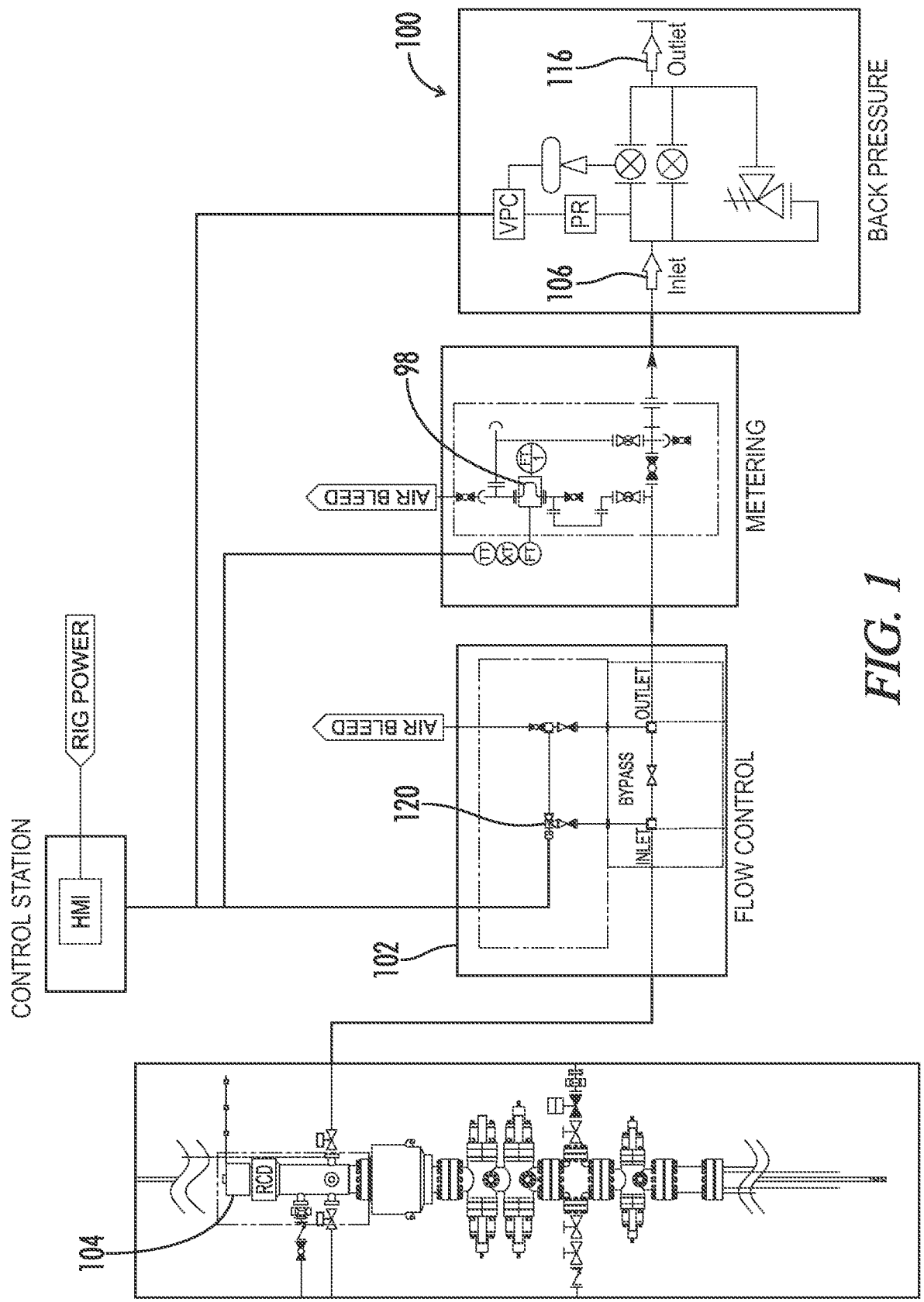
FIG. 1 is a schematic view of one embodiment of the present invention.
Figure 2:
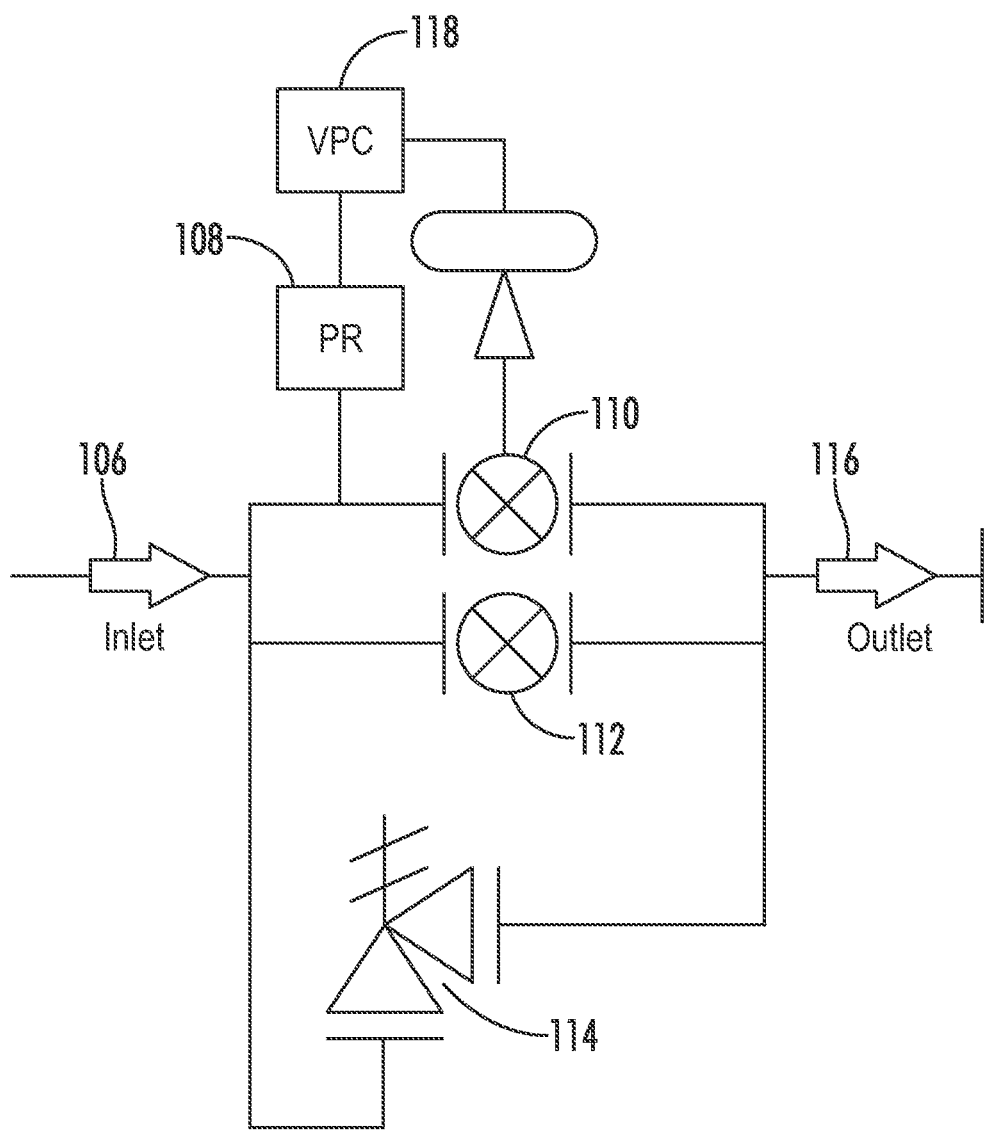
FIG. 2 is a partial schematic view thereof.

Referring to FIGS. 1 and 2, the present invention provides a flow control device located downstream from the flow meter, such as the Coriolis meter 98. The present invention is implemented in a managed pressure drilling system 102. The back pressure management system is generally shown as 100. The back pressure management system 100 is located downstream of the managed pressure drilling system 102 that is located downstream of the RCD 104.

Referring to FIGS. 1 and 2, the back pressure management system 100 is installed on a manifold. In one embodiment, a flanged connection attaches the back pressure management system 100 to the drilling configuration.

The back pressure management system 100 provides an inlet 106 downstream of the flow meter, such as the Coriolis meter 98 as shown in FIGS. 1 and 2. A pressure regulator 108 monitors the pressure. The pressure regulator 108 sets the back pressure. In one embodiment, the pressure regulator 108 sets the back pressure to less than or equal to fifty percent (50%) of the surface back pressure.

The pressure regulator 108 provides a simple to use and reasonably accurate regulator that sets the back pressure. In one embodiment, the pressure regulator 108 provides a standalone device that is not controlled by any external control system. The pressure regulator 108 of another embodiment may be controlled by an external control system.

The back pressure management system 100 provides multiple flow control devices 110, 112 and relief valve 114 to control the flow and pressure through the back pressure management system. These flow control devices 110, 112 and relief valve 114 maintain back pressure and relieve pressure that may exist within the system.

Flow control device 110 may be implemented as a valve. Flow control device 110 provides a control valve that handles drilling muds, oil, and water based drilling muds that carry small particle sized drilled cuttings. Oil and water based drilling muds carry drilled cuttings from the wellbore through surface piping and back to the rigs mud handling system. Flow control device 110 applies back pressure to the flow meter, such as the Coriolis meter to minimize or prevent gas breakout in the flow meter. The back pressure created by valve 110 improves the accuracy of the meter.

The back pressure management system of one embodiment regulates return flow to maintain a back pressure. Such an embodiment may not require sealing shut off. Flow control device 110 of one embodiment properly handles pressure control in a range of 0 to 500 psi, more typically 100-200 psi.

The actuator must be capable of opening flow control device 110 with full differential pressure of 1440 psi across the flow control device 110. Flow control device 110 should be fail open. The actuator for the flow control device 110 can be electric, pneumatic, or hydraulic. The valve position controller 118 adjusts the flow control device 110 to set the back pressure to be applied by the flow control device on the flow meter, such as the Coriolis meter.

In one embodiment that receives external control, valve 110 receives a pressure control set point from the MPD SCADA (Supervisory Control & Data Acquisition) system as shown in FIG. 1. Logic in the control system maintains the set point for pressure control as either ≤50% of the set pressure for the flow control device 120, such as an MPD chokes, up to a maximum set point pressure for valve 110 of 1440 psi (the system's designed working pressure of the downstream choke components).

Flow control device 112 serves as a bypass that avoids flow control device 110. To bypass the valve 110, the system opens flow control device 112 and closes flow control device 110. Opening valve 112 and closing valve 110 bypasses the system such that the system does not apply the back pressure through flow control device 110.

The back pressure management system 100 also provides a pressure relief valve 114. Relief valve 114 should provide a simple/field pressure settable. After activation, the relief valve 114 of one embodiment must be able to be reset in the field. Relief valve 114 provides pressure relief and full flow bypass in the event of blockage of the flow meter, such as the Coriolis meter, or failure of flow control device 110.

The present invention also provides a method of maintaining back pressure. A pressure regulator monitors the surface back pressure. The method sets the back pressure to a percentage of the surface back pressure. In one embodiment, the method enables usage of flow control devices to control the back pressure. The flow control devices open and close to set the back pressure to less than or equal to fifty percent of the surface back pressure.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A back pressure system for reducing gas break out of a drilling fluid in a flow meter installed in managed pressure drilling (MPD) metering with back pressure wherein the drilling fluid flows downstream from the flow meter to the back pressure system, the system comprising:
    a first flow control device located downstream of the flow meter wherein the first flow control device is adjustable to apply back pressure on the flow meter;
    a pressure regulator that sets the back pressure applied by the first flow control device, wherein the pressure regulator adjusts the first flow control device based upon a pressure measured downstream of the flow meter.

2. The system of claim 1 further comprising:
    a second flow control device located downstream of the flow meter wherein the second flow control device is positioned in parallel to the first flow control device wherein the second flow control device opens to provide a bypass around the first flow control device.

3. The system of claim 2 further comprising:
    a relief valve located downstream of the flow meter wherein the relief valve is positioned in parallel to the first flow control device and the second flow control device.

4. The system of claim 3 wherein the pressure regulator sets the back pressure applied by the first flow control device to less than or equal to fifty percent (50%) of a surface back pressure upstream of the flow meter.

5. The system of claim 1 further comprising:
    an actuator that opens and closes the first flow control device.

6. The system of claim 2 further comprising:
    a Supervisory Control and Data Acquisition (SCADA) system that sets a pressure control set point for the back pressure applied by the first flow control device.

7. The system of claim 6 wherein the SCADA system sets the pressure control set point at less than or equal to fifty percent of the pressure of a flow control device of a managed pressured drilling system located upstream of the flow meter.

8. The system of claim 1 wherein the first flow control device is a fail open flow control device.

9. The system of claim 2 wherein the second flow control device closes to direct the drilling fluid to the first flow control device, wherein the first flow control device adjusts an opening in the first flow control device to apply back pressure to the flow meter.

10. A back pressure system for reducing gas break out of a drilling fluid in a flow meter installed in managed pressure drilling (MPD) metering with back pressure wherein the drilling fluid flows downstream from the flow meter to the back pressure system, the system comprising:
    a first flow control device located downstream of the flow meter wherein the first flow control device is adjustable to control back pressure on the flow meter;
    a pressure regulator that sets the back pressure applied by the first flow control device,
    wherein the pressure regulator sets the back pressure applied by the first flow control device to less than or equal to fifty percent (50%) of a surface back pressure upstream of the flow meter.

11. The system of claim 10 further comprising:
    an inlet located downstream of the flow meter;
    a second flow control device located downstream of the inlet wherein the second flow control device is positioned in parallel to the first control device, wherein the second flow control device opens to provide a bypass around the first flow control device.

12. The system of claim 11 further comprising:
    a relief valve located downstream of the inlet, wherein the relief valve is positioned in parallel to the first flow control device and the second flow control device wherein the relief valve provides relief for the first flow control device.

13. The system of claim 12 further comprising:
    a Supervisory Control and Data Acquisition (SCADA) system that sets a pressure control set point for the back pressure applied by the first flow control device, wherein the SCADA system sets the pressure control set point at less than or equal to fifty percent of the pressure of a flow control device of a managed pressured drilling system located upstream of the flow meter.

14. The system of claim 10 wherein the first flow control device is a fail open flow control device.

15. The system of claim 11 wherein the second flow control device closes to direct the drilling fluid to the first flow control device, wherein the first flow control device adjusts an opening in the first flow control device to apply back pressure to the flow meter.

16. The system of claim 11 wherein the first flow control device closes to direct the drilling fluid through the second flow control device to bypass the first flow control device and avoid applying back pressure to the flow meter via the first flow control device.

17. A back pressure system for reducing gas break out of a drilling fluid in a flow meter installed in managed pressure drilling (MPD) metering with back pressure wherein the drilling fluid flows downstream from the flow meter to the back pressure system, the system comprising:
    a first flow control device located downstream of the flow meter wherein the first flow control device is adjustable to apply back pressure on the flow meter;
    a pressure regulator that sets the back pressure applied by the first flow control device;
    a bypass path that provides a path for the drilling fluid that bypasses the flow meter and the first flow control device.

18. The system of claim 17 further comprising:
    a second flow control device located downstream of the flow meter wherein the second flow control device is positioned in parallel to the first flow control device wherein the second flow control device is configured to open and close to allow flow through the bypass path;
    a relief valve located downstream of the flow meter wherein the relief valve is positioned in parallel to the first flow control device and the second flow control device wherein the relief valve provides relief for the first flow control device.

19. The system of claim 17 wherein the pressure regulator sets the back pressure applied by the first flow control device to less than or equal to fifty percent (50%) of a surface back pressure upstream of the flow meter.

* * * * *